United States Patent [19]
Edwards et al.

[11] Patent Number: 5,644,895
[45] Date of Patent: Jul. 8, 1997

[54] PACKAGING ARRANGEMENT

[75] Inventors: Russell James Edwards, Jacksonville, Fla.; Hirokazu Kitagawa, Chiba-Pref., Japan; Kiyoshi Imai; Masao Funo, both of Saitama-Pref., Japan; William Edward Holley, Ponte Vedra Beach, Fla.; Charles R. Hood; Richard Wayne Abrams, both of Jacksonville, Fla.

[73] Assignee: Johnson & Johnson Vision Products, Inc., Jacksonville, Fla.

[21] Appl. No.: 431,891

[22] Filed: May 1, 1995

[51] Int. Cl.$^6$ .............................. B65B 7/28; B65B 47/00; B65B 55/22; B65B 57/02
[52] U.S. Cl. .................... 53/55; 53/64; 53/75; 53/559
[58] Field of Search .......................... 53/559, 55, 76, 53/75, 69, 67, 64, 249, 202, 569

[56] References Cited

U.S. PATENT DOCUMENTS

| | | | |
|---|---|---|---|
| 3,708,949 | 1/1973 | Wilcox | 53/53 |
| 3,874,143 | 4/1975 | Braber | 53/559 X |
| 4,033,092 | 7/1977 | Vetter | 53/559 X |
| 4,209,957 | 7/1980 | Utzmann | 53/561 X |
| 4,726,173 | 2/1988 | Giatti | 53/559 |
| 4,819,406 | 4/1989 | Redmond | 53/559 X |
| 4,999,979 | 3/1991 | Vicq | 53/559 |

*Primary Examiner*—James F. Coan

[57] ABSTRACT

A packaging arrangement for packaging products such as contact lenses in packages such as blister packs. The packaging arrangement includes an intermittently indexed, linearly driven endless conveyor which includes a plurality of identical support pallets, equally spaced apart along the endless conveyor. Each support pallet is designed to support and align an array of individual package bases. The arrangement is such that each support pallet with an array of individual package bases thereon is sequentially stopped at a plurality of spaced work stations along the endless conveyor.

17 Claims, 11 Drawing Sheets

PACKAGING ARRANGEMENT

BACKGROUND OF THE INVENTION

1. Field of the Invention

The present invention relates generally to packaging arrangements for packaging products such as contact lenses in packages such as blister packs.

More particularly, the subject invention pertains to a packaging arrangement having an intermittently indexed, linearly driven endless conveyor which includes a plurality of identical support pallets, equally spaced apart along the movable conveyor. Each support pallet is designed to support a 2×5 array of individual package bases thereon, and is sequentially stopped at spaced work stations along the packaging arrangement. At a first station, a robotic loader arm loads blister package bases, each having a product deposited therein, in the support pallet then at the first station. At subsequent spaced stations, the packaging arrangement optically inspects the loaded pallet for skewed (improperly positioned) package bases, optically verifies the presence of a package base at each array location in the pallet, deposits a fixed dosage of saline solution into each package base, optically verifies that a proper dosage of saline solution has been deposited into each package base, places a laminated foil cover sheet over each 1×5 row of package bases, mechanically chucks each laminated cover sheet to properly position it relative to the row of package bases, optically verifies the presence and proper positioning of each laminated cover sheet, heat seals each laminated cover sheet to a row of package bases, optically inspects each heat sealed laminated cover sheet for proper positioning relative to the row of package bases, and finally unloads each row or strip of completed blister packs from the endless conveyor for subsequent processing such as sterilization and secondary packaging.

2. Discussion of the Prior Art

The prior art discloses the use of linear conveyor arrangements and also rotary index tables in packaging equipment, the packaging of contact lens in blister packs with saline solution, and the checking of various packages by a variety of optical probes. Moreover, the prior art also discloses heat sealing lids or covers to container bases. However, in most prior art methods of heat sealing, the temperature of the sealing heads are generally maintained at lower temperatures, and the sealing heads are generally applied for longer periods of time as compared with the present invention. In one prior art approach, a pneumatic cylinder pressed a heated sealing head against the covers being applied to package bases, and a load cell feedback system measured the load on the pneumatic cylinder, which started a measured heater timing period.

The present invention is related to patent application Ser. No. 08/257,787, filed Jun. 10, 1994, for a Packaging Arrangement for packaging products such as contact lenses in blister packs. The packaging arrangement disclosed therein includes a rotary index table defining on its upper surface a plurality of identical, radially-oriented support pallets, equally spaced apart around the rotary index table. Each support pallet is designed to support an array of individual package bases thereon, and is sequentially rotated to stop at angularly spaced radial positions in the rotary packaging machine. At a first radial position, blister package bases, each having a product deposited therein, are placed in the support pallet then at the first radial position. At subsequent radial positions, the rotary packaging machine verifies the presence and alignment of each package base, deposits a fixed dosage of saline solution into each package base, optionally verifies that a fixed dosage of saline solution has been deposited in each package base, places a marked laminated cover over the package bases, heat seals the laminated cover to the package bases, verifies the proper positional placement of the laminated cover on the package bases, and finally unloads the completed blister packs from the rotary packaging station for subsequent processing such as sterilization and secondary packaging.

Such a rotary packaging station has a plurality of angularly displaced work stations, some of which must interface with outside equipment such as robotic handling arms, which can present problems with positioning alignment and space allocation. In contrast thereto, the linearly driven endless conveyor of the present invention is much easier and simpler to design and to interface with associated handling and supply equipment such as cartesian (x,y) robotic handling equipment.

SUMMARY OF THE INVENTION

Accordingly, it is a primary object of the present invention to provide a packaging arrangement for packaging products, such as contact lenses, in packages such as blister packs.

A further object of the subject invention is the provision of a packaging arrangement having an intermittently indexed, linearly driven endless conveyor which includes a plurality of identical support pallets, equally spaced apart along the movable conveyor. Each support pallet is designed to support an array of individual blister package bases thereon, and is sequentially stopped at spaced work stations along the movable conveyor, at which a sequence of packaging operations are performed thereon.

In accordance with the teachings herein, the present invention provides a packaging arrangement for packaging products such as contact lenses in packages such as blister packs. The packaging arrangement includes an intermittently indexed, linearly driven endless conveyor which includes a plurality of identical support pallets, equally spaced apart along the endless conveyor. Each support pallet is designed to support and align an array of individual package bases. The arrangement is such that each support pallet with an array of individual package bases thereon is sequentially stopped at a plurality of spaced work stations along the endless conveyor.

In greater detail, at an initial work station a loader loads an array of individual blister package bases, each of which has a contact lens therein, into the support pallet stopped at the initial station. Each support pallet supports and aligns a plurality of adjacent rows of individual package bases. In a preferred embodiment, each support pallet supports an array of 2×5 package bases arranged in two side by side rows. After a laminated foil cover sheet is applied over a 1×5 row of package bases, the package strip is approximately 150 mm long and 43 mm wide. However, it should be appreciated that alternative embodiments of the present invention can be designed with a different number of rows and a different number of packages in each row.

The packaging arrangement receives individual package bases, each of which has a product therein, which are lined up and queued for packaging in side by side columns on an accumulator conveyor belt. The package bases are precisely positioned relative to each other in the side by side columns such that a robotic handling arm, having an array of vacuum handling cups, one for each individual package base, can pick up a 2×5 array of package bases from the accumulator belts and deposit them onto a support pallet at the first station on the conveyor loop.

The support pallet spaces the side of each package base a nominal distance, in a range of 200 to 400 μmeters, from the side of each adjacent package base in the support pallet to prevent overlapping sides of adjacent product bases. The side by side columns on the accumulator conveyor belt accumulate package bases in positions in which package bases directly touch adjacent package bases. To compensate for the slight difference in spacing from the accumulator conveyor belt to the pallet, the robotic arm, after positioning an array of package bases over a pallet, releases the vacuum in each vacuum cup to allow the package bases to fall into the support pallet. The robotic arm then raises and lowers the array of suction cups slightly to tap each package base into a properly aligned position in the support pallet. Each package base includes a rounded product cavity and alignment notches on opposite sides thereof. The support pallet defines a rounded cavity for receiving each product cavity of each package base and alignment rods which fit into and align with the alignment notches on the package base.

A slide unit is supported above the endless conveyor for reciprocating upstream and downstream movement, relative to the endless conveyor, and supports an array of operating mechanisms for performing operating functions on an array of individual package bases supported in a pallet positioned therebelow. The slide unit reciprocates through upstream and downstream movements a distance equal to the distance between adjacent rows, such that the array of operating mechanisms is successively positioned over each 1×5 row of package bases in each support pallet.

The slide unit supports a plurality of different arrays of operating mechanisms, spaced apart by the distance separating adjacent pallets on the endless conveyor, such that each array of operating mechanisms is positioned above a different pallet on the endless conveyor, and each array of operating mechanisms performs a different operating function on the individual package bases.

A first array of operating mechanisms includes an array of optical detector probes for performing an optical detecting function on the individual package bases, such as verifying the presence of a package base at each array location in the pallet. In greater detail, each optical detector probe preferably comprises a dual optical fiber arrangement in which one optical fiber carries light to illuminate the package base, and a second optical fiber carries light reflected from the package base to a photodetector.

A second array of operating mechanisms includes an array of dosing tubes for dispensing given dosages of saline solution into the individual package bases. Each dosing tube is supplied by a separate metering pump to deposit a precisely metered dosage of saline solution into each package base, such that each contact lens is immersed in saline solution.

A third array of operating mechanisms includes an array of optical detector probes positioned above the endless conveyor downstream of the array of dosing tubes to verify that a given dosage (level of solution) of saline solution has been deposited into each package base.

The movable slide unit supports the first array of optical verification probes one pallet increment ahead of the dosing tubes on the endless conveyor, which are positioned one pallet increment ahead of the array of dosing verification optical probes. After the robotic arm deposits the package bases in the support pallet at an entry end of the packaging arrangement, the endless conveyor moves ahead one pallet increment. The slide unit then positions each array of operating mechanisms above the upstream 1×5 rows of package bases in adjacent pallets, the probes and dosing tubes perform their respective functions, and the slide unit then positions them above the downstream 1×5 rows of package bases in the same adjacent pallets where they repeat their respective functions, after which the endless conveyor is advanced one pallet increment. The base presence optical verification probes are one pallet increment ahead of the dosing tubes to verify that the package bases are present before the dosing tubes fill the package bases with saline solution, and the solution presence optical probes are positioned one pallet increment behind the dosing tubes.

After loading of the package bases into a support pallet at the initial station, an alignment probe verifies the alignment of the packaging bases in the support pallet to ensure that no package bases are skewed or tilted. The alignment probe includes at least one through-bee detector which directs a beam of light along the length of and just above a row of package bases supported in the pallet to a detector at the other end of the column, such that a package base which is skewed or tilted in the pallet will interrupt the through beam, and the photodetector at the other end of the through beam so indicates.

At a subsequent foil placement station, a foil pick and place unit, having an array of suction cups, places a strip sheet of laminated foil covers over each 1×5 row of the array of package bases.

At a subsequent mechanical chucking station, at least one movable chucking arm mechanically chucks each sheet of laminated foil covers to ensure that the sheet is properly positioned and aligned relative to the array of package bases. The arrangement preferably includes two movable chucking arms positioned at opposite ends of a row of package bases. Each movable chucking arm includes an angled U bracket which engages and centers one end of the sheet of laminated foil covers relative to a row of package bases.

An optical inspection station is located downstream of the mechanical chucking station, to ascertain the presence and proper general positioning of each sheet of laminated foil covers on the array of package bases. The optical inspection station includes a plurality of optical detector probes which examine the outer edges of each cover sheet to ascertain that each sheet of laminated foil covers is present and properly positioned relative to the row of package bases. The optical detector probes are preferably positioned with one probe at each end (along the 45 mm side) and one probe along the lengthwise edge (along the 150 mm side) of a properly positioned sheet of laminated foil cover on each 1×5 row. Each optical detector probe is preferably a triangulation type of probe wherein an optical beam from an emitter is triangulated and reflected by the foil cover to an angularly positioned optical fiber detector, as are available commercially from Omron. This optical inspection station ensures the presence and general positioning of a laminated foil cover sheet on each row of package bases, to ensure that a heated sealing head in a subsequent heat sealing station does not press down on an uncovered row of package bases which would then melt onto and foul the heated sealing head.

At a subsequent heat sealing station, a heated sealing head heat seals the laminated foil covers to the package bases. At the heat sealing station, an electrically heated seal head is pressed by a pneumatic cylinder against the laminated covers on the package bases. A thermal transducer measures the temperature of the seal head to maintain the temperature at 214° C.±1.5° C. An in-line load cell measures the force generated by the pneumatic cylinder, and when a predetermined force is reached, which is approximately 75% of a normal full operating force, a timer is initiated. The timer times a relatively short time period of approximately 1.0 to 1.4 seconds, after which the pressure in the pneumatic cylinder is released, thereby forming a seal between each laminated cover and package base which is both detachable and consumer friendly. The predetermined force is a given percentage, e.g., 60–75% of the normal full operating force that the pneumatic cylinder is capable of generating. The endless conveyor is reinforced by a die stopper support under the heat sealing station to withstand the forces imparted thereto by the pneumatic sealing cylinder.

A second optical inspection station is located downstream of the heat sealing station, and also includes a plurality of optical detector probes which examine the outer edges of each sheet of laminated foil covers on the array of package bases to ascertain that the sheet is properly and precisely positioned and heat sealed relative to the array of package bases. The optical detector probes are preferably positioned with five probes along the lengthwise edge (along the 150 mm side) of a properly positioned sheet of laminated foil cover on each 1×5 row. Each optical detector probe is preferably a triangulation type of probe wherein an optical beam from an emitter is triangulated and reflected by the foil cover to an angularly positioned optical detector, as are available commercially from Omron.

Pursuant to one advantageous feature of the present invention, each pallet includes a plurality of alignment cones which align with a plurality of conical alignment cavities carried by equipment at the work stations spaced along the endless conveyor to assist in precisely aligning the equipment relative to each pallet and the array of package bases carried therein. Each pallet is rectangularly shaped, and preferably includes an alignment cone at at least two diagonally spaced corners of the rectangular pallet.

The heat sealing station includes a pneumatic drive cylinder and a heated sealing head which is driven by the pneumatic drive cylinder. Conical alignment cavities are carried thereon to align the heated sealing head with a pallet, and the heated sealing head is coupled to the pneumatic drive cylinder by a plurality of floating joints to allow the heated sealing head to shift laterally a slight amount while the alignment cones are engaging the conical alignment cavities to precisely align the heated sealing head with a pallet.

The two optical inspection stations (before and after heat sealing) also include a pneumatic drive cylinder and an inspection head which is driven by the pneumatic drive cylinder. Conical alignment cavities are also carried thereon to align the inspection head with a pallet, and the inspection head is coupled to the pneumatic drive cylinder by a plurality of floating joints to allow the inspection head to shift laterally a slight amount while the alignment cones are engaging the conical alignment cavities to precisely align the inspection head with a pallet.

The loading robotic arm at the beginning of the endless conveyor, an unloading robotic arm at the end of the endless conveyor, and also the foil pick and place unit at the foil placement station all preferably include conical alignment cavities thereon to align the apparatus with each pallet.

Pursuant to another advantageous feature of the present invention, each of the support pallets is designed to support and align an array comprising at least two rows of package bases. An optical inspection station is located downstream of the heat sealing station, and ascertains whether or not each sheet of laminated foil covers is properly positioned relative to a row of package bases. Rows of covered packages which pass inspection are transferred by a robotic transfer arm from the endless conveyor to an output for final secondary packaging, while rows of covered packages which fail the inspection are not removed, and the system controller responds to the inspection station and controls the transfer equipment to discriminate between passed and failed rows, even in the same support pallet. In greater detail, the robotic arm applies a vacuum to a pneumatically driven robotic arm, having three vacuum suction cups for each individual 1×5 array package, lifts each 1×5 array of packages from the support pallet, and transfers passed rows of covered packages from the endless conveyor to an output for secondary packaging, while a vacuum is not applied to the suction cups for failed packages. A reject chute is positioned below the downstream end of the endless conveyor, and failed rows of covered packages remain on the endless conveyor and are dumped into the reject chute. Rows of covered packages in the same support pallet are discriminated by either applying a vacuum to the three suction cups for that row or not.

BRIEF DESCRIPTION OF THE DRAWINGS

The foregoing objects and advantages of the present invention for a packaging arrangement may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
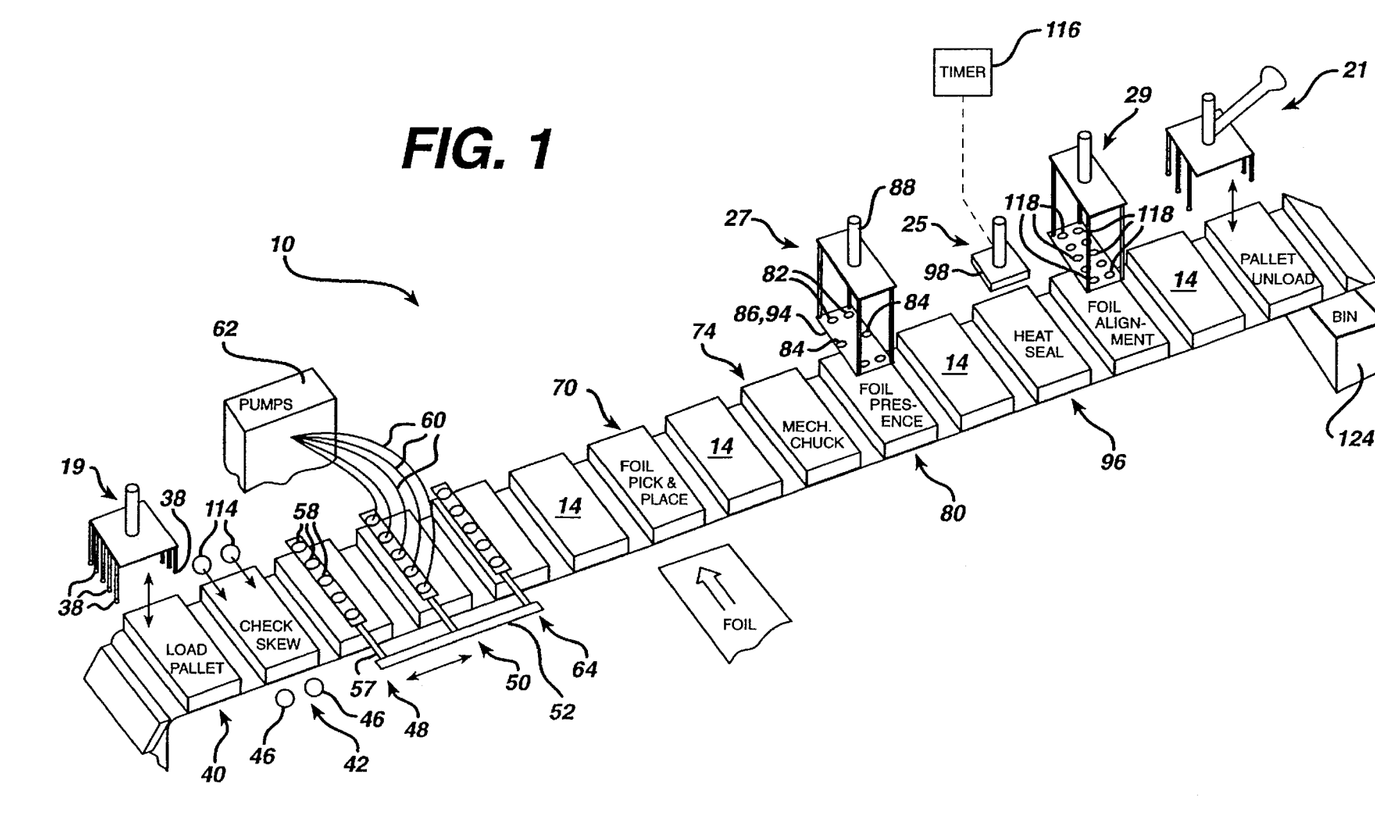
FIG. 1 is a schematic device layout illustration of a packaging arrangement constructed pursuant to the teachings of the present invention.

Referring to the drawings in detail, FIG. 1 is a schematic device layout illustration of a packaging arrangement or machine 10 constructed pursuant to the teachings of the present invention, for packaging products, such as contact lenses, into packages such as blister packs. The packaging machine 10 includes an endless conveyor having a plurality of pallets 14 spaced therealong. The pallets are connected by chain linkages 12, FIGS. 7, 11 and 12, and the assembly forms an endless loop as shown best in FIGS. 1 and 2 which is intermittently driven such that the pallets stop at work stations sequentially spaced along the upper surface of the packaging arrangement 10.

Figure 7:
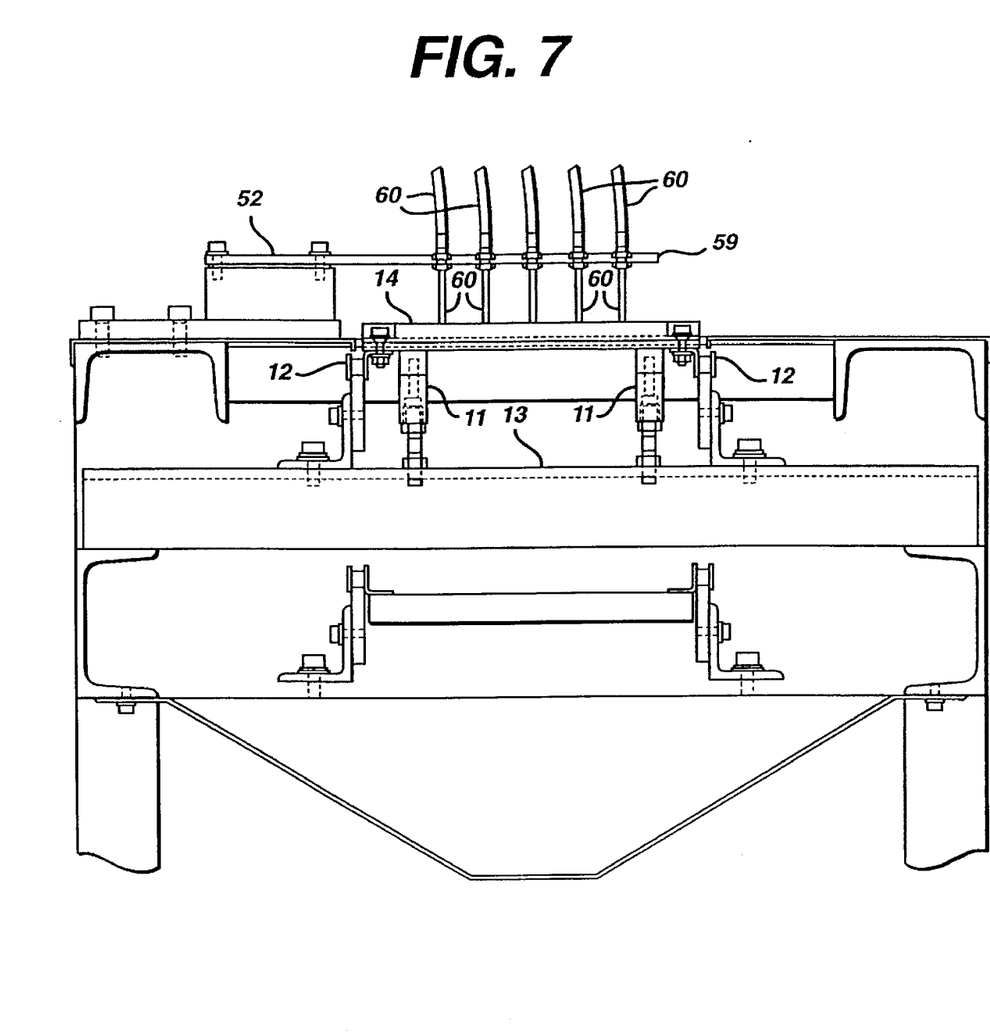
FIG. 7 is an elevational view of a 1×5 array of dosing nozzles, supported on a movable slide unit above the endless conveyor, for supplying a metered dosage of saline solution to each of the packet bases supported in a 1×5 row in the support pallet therebelow.

The packaging arrangement defines an upper surface on which a pair of spaced support rails 11, FIG. 7, are supported by frame members 13. The pallets 14, connected together by the chain linkages 12, slide along the spaced support rails 11. Each pallet has a conical alignment lug 15 positioned at two diagonally opposed corners which cooperates with depending conical positioning members 17 depending from the various apparatus at the work stations, such that as the various apparatus or robotic equipment at the work stations is lowered relative to the pallet, the conical alignment lugs 15 serve to align the conical positioning members 17 of the apparatus to properly position the apparatus with respect to the pallet 14 and the package bases supported thereby. A robotic loading arm 19 at the beginning of the endless conveyor, a robotic unloading arm 21 at the end of the endless conveyor, a foil pick and place unit 23 at a foil placement station, a mechanical chucking station 74, a heat seal unit 25, and also the optical inspection stations 27, 29 before and after the heat seal unit, all preferably include conical alignment cavities thereon to align the movable apparatus thereat with each pallet.

Figure 8:
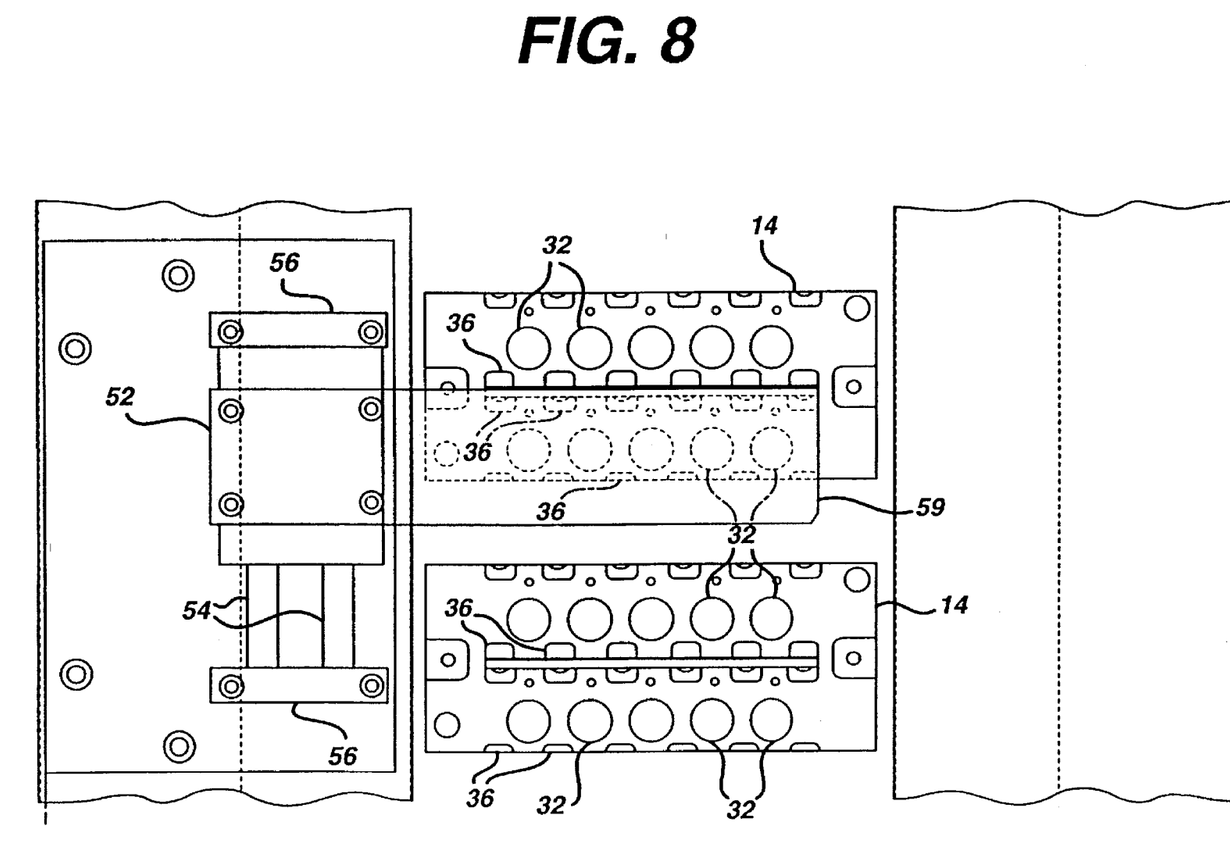
FIG. 8 is a top plan view of the movable slide unit which supports the 1×5 array of dosing nozzles of FIG. 7, and which also supports a 1×5 array of package base presence verification optical probes, for linear reciprocal movements above adjacent support pallets in the endless conveyor.

Each support pallet 14 is particularly designed to support a 2×5 array of individual blister pack bases 16 arranged in two adjacent 1×5 rows, as illustrated in FIG. 8. However, it should be appreciated that alternative embodiments of the present invention can be designed with a different number of rows and a different number of packages in each row.

Figure 4:
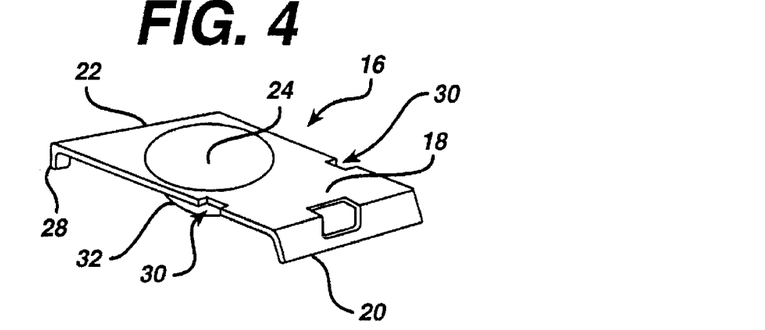
FIGS. 4 and 5 are respectively perspective and top planar views of a representative blister package base.
Figure 5:
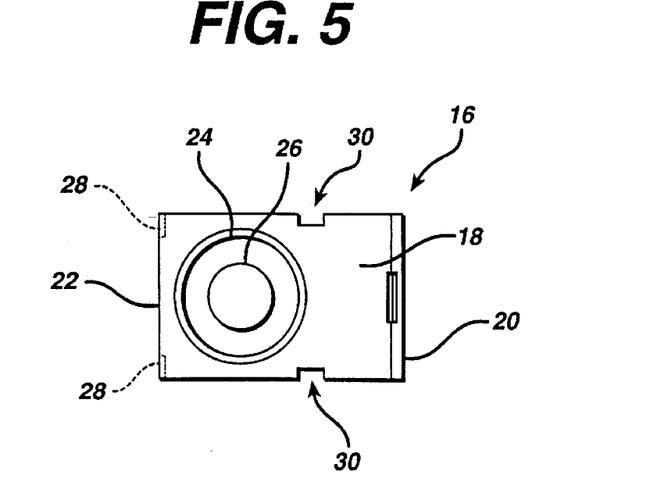
Figure 6:
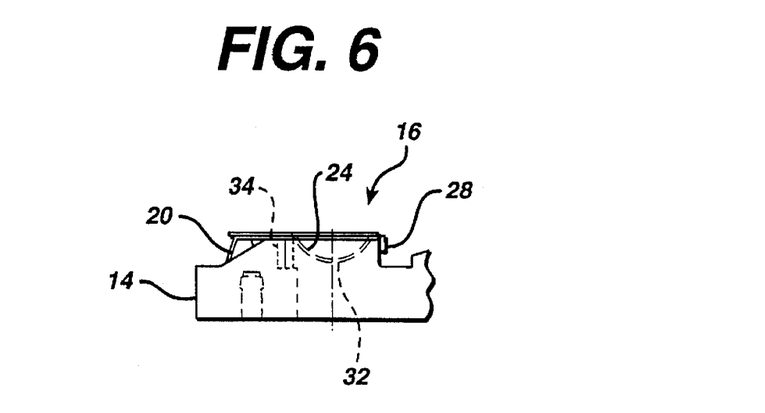
FIG. 6 is a fragmentary end view of one half of a support pallet illustrating a blister package base supported therein.

Each blister package base 16, as represented in further detail in FIGS. 4, 5 and 6 of the drawings, includes a planar, essentially rectangularly shaped flange 18 having an integral angularly depending wall portion 20 at one end thereof. A cavity 24 is formed offset towards an opposite edge 22 of the flange 18, which is of an essentially semispherical configuration, generally in conformance with the curvilinear shape of a contact lens 26, FIG. 5, adapted to be stored therein in a sealed condition while immersed in a suitable sterile saline solution. The height of the angled wall portion 20 depending from the planar flange 18 is somewhat analogous to the height or depth of the cavity 24 containing the contact lens, as can be ascertained more clearly from FIG. 6 of the drawings. Each package base further includes depending legs 28 at each corner of side 22, opposite to the side with depending wall portion 20, and alignment notches 30 on opposite sides of the planar flange 18. Each support pallet 14 defines a rounded cavity 32 for receiving each product cavity 24 of each package base, and insets 36 which receive the depending legs 28 of adjacent package bases 26, as illustrated best in FIGS. 6 and 8.

Each blister pack base 16 may be a shaped injection-molded plastic structure, which may be constituted of polypropylene, of generally rigid or semi-rigid configuration. A cover is adapted to be secured or bonded, such as by heat sealing to the flange 18 surfaces around the product-receiving cavity. Each cover may comprise a multi-layered foil laminate, as disclosed in U.S. patent application Ser. No. 08/442,234, filed May 15, 1995. The metallic foil laminate preferably includes a polypropylene bottom layer which is adapted to be bonded to contiguous sealing surfaces on the injection-molded shaped plastic package base, as by heat sealing or the like, to form a complete packaging structure as is well known in the packaging technology. A blister package of this type is disclosed, for example, in U.S. Pat. No. 4,691,820, commonly assigned to the assignee of this application.

Through the intermediary of thermal transfer printing, appropriately variable and changeable printed data are imparted to an exterior surface of the foil laminate. When the laminate is severed into lid-forming labels for respective packages, the data may consist of suitable changeable lot numbers, expiration dates, and other physical data representative of the specific product housed in the package, for instance, data with regard to the power of a contact lens which is packaged in a cavity of the blister pack while immersed in a suitable protective sterilized saline solution.

Referring to FIG. 1, at an initial work station 40, a robotic loading arm 19 transfers a 2×5 array of package bases 16, each of which is secured to the robotic loading arm by a suction cup, and places the package bases in the support pallet 14 then at the first work station.

The lens packaging station receives individual blister package bases, each of which has a contact lens therein, which are lined up and queued for packaging on two side by side accumulator columns on a conveyor belt. The package bases are precisely accumulated in the side by side accumulator columns such that the robotic handling arm, having a 2×5 array of vacuum handling cups, one for each individual blister pack base, can pick up a 2×5 array of individual blister pack bases 16 and load the blister pack bases onto a pallet 14 on the endless conveyor.

Each support pallet 14 has a unique design relative to prior art support pallets, in that the package bases are nominally positioned in the support pallet by the receiving cavities 32 with a separation, in the range of 200 to 400 μmeters, between the shoulders of adjacent package bases. The separation also aids in subsequent separation of the resultant adjacent blister packs. The support pallet 14 spaces the side of each package base 16 a nominal distance, in the range of 200 to 400 μmeters, from the side of each adjacent package base in the support pallet, to prevent overlapping edges of adjacent product bases. However, the side by side accumulator columns accumulate package bases 16 in positions in which package bases directly touch adjacent package bases 16. To compensate for the slight difference from the nominal distance between adjacent package bases in the pallet, the robotic arm 19, after positioning an array of package bases over a pallet 14, initially releases the vacuum in each vacuum cup 38 to allow the package bases to rest in the support pallet 14. The robotic arm 19 then raises and lowers the array of suction cups 35 slightly to tap each package base 16 into a properly aligned position in the support pallet 14, as provided for by the rounded product cavity aligning with respect to the cavity 32, and the legs 28 aligning with respect to the inserts 36.

The linear conveyor is then intermittently indexed through successive work stations, stopping for approximately 5–6 seconds at each work station, such that all of the operations as described herein can be performed simultaneously at the successive work stations. At a second work station 42, an alignment check is made to check that no package bases 16 are skewed or tilted in the support pallet 14. The alignment check is performed by two through-beam detectors, as are available commercially from Keyence, each of which includes a light source 44, FIG. 9, which directs a beam of light along the length of and just above a 1×5 column of package bases 16 supported in the pallet 14 to a detector 46 at the other end of the column. If a package base 16 is skewed or tilted in the pallet 14, it will interrupt the through beam, and the photodetector 46 at the other end of the through beam will so indicate.

At third, fourth and fifth positions 48, 50 and 64, a slide unit 52, FIGS. 1 and 8, is displaceable, along slide rails 54 with end stops 56, above the endless conveyor by a pneumatic drive cylinder to reciprocate back and forth, along the direction of travel of the endless conveyor, between upstream and downstream positions which are spaced apart by the distance between the two rows in each pallet.

The slide unit supports an array of operating mechanisms for performing operating functions on an array of individual package bases supported in a pallet 14 positioned therebelow. The slide unit reciprocates through upstream and downstream movements a distance equal to the distance between adjacent rows, such that the array of operating mechanisms is successively positioned over each 1×5 row of package bases in each support pallet.

The slide unit supports a plurality of different arrays of operating mechanisms, spaced apart by the distance separating adjacent pallets on the endless conveyor, such that each array of operating mechanisms is positioned above a different pallet 14 on the endless conveyor, and each array of operating mechanisms performs a different operating function on the individual package bases.

The slide unit supports a holder arm 57 for a 1×5 array of optical probes 58 positioned above the third station 48, a 1×5 array of dosing tubes 60 positioned above the fourth station, and a 1×5 array of dosing verification optical probes positioned above the fifth station 64.

Figure 2:
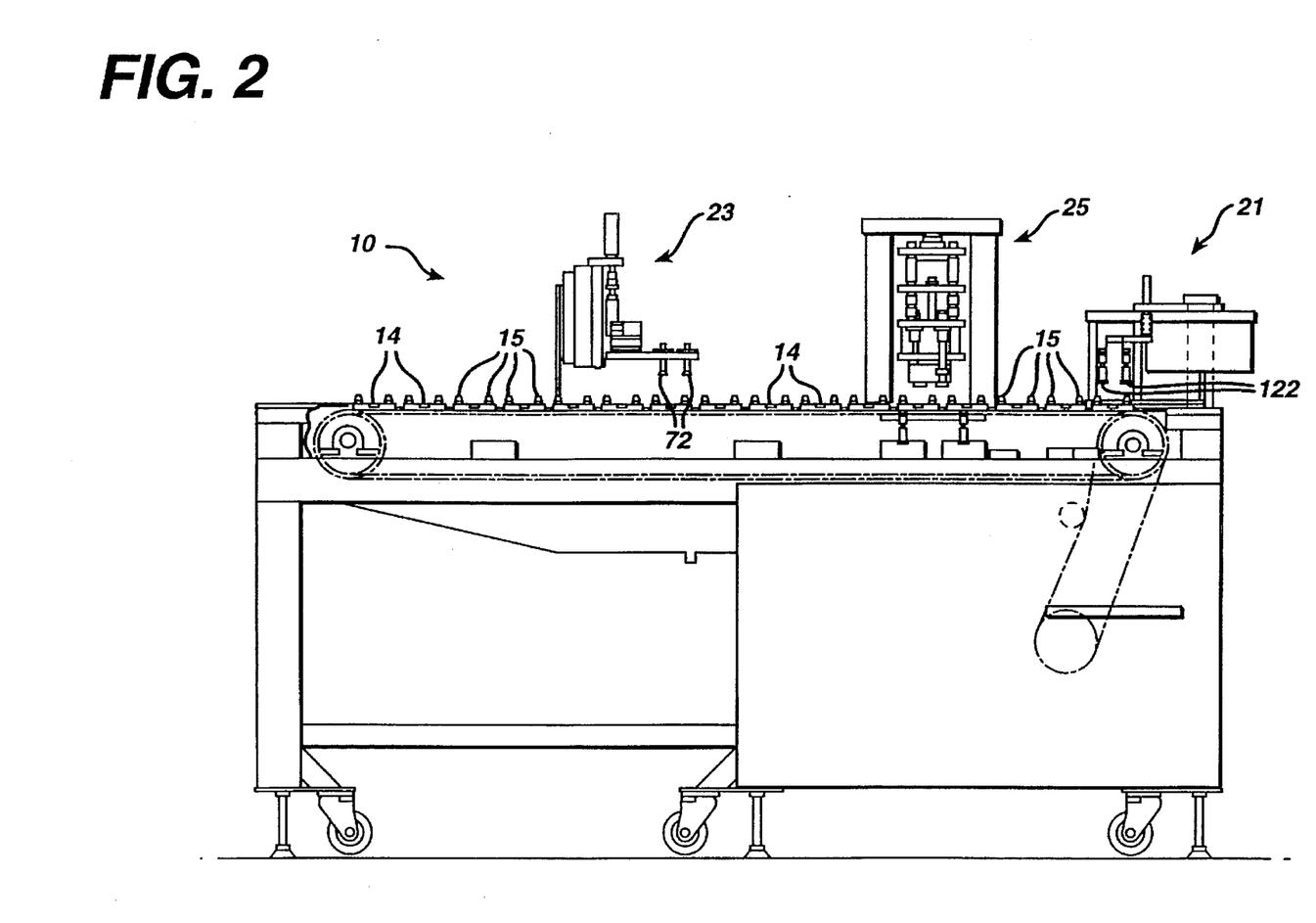
FIG. 2 is a front elevational view illustrating some of the components (several components have been omitted for clarity) of one designed embodiment of a linear endless conveyor packaging arrangement constructed pursuant to the teachings of the subject invention.
Figure 9:
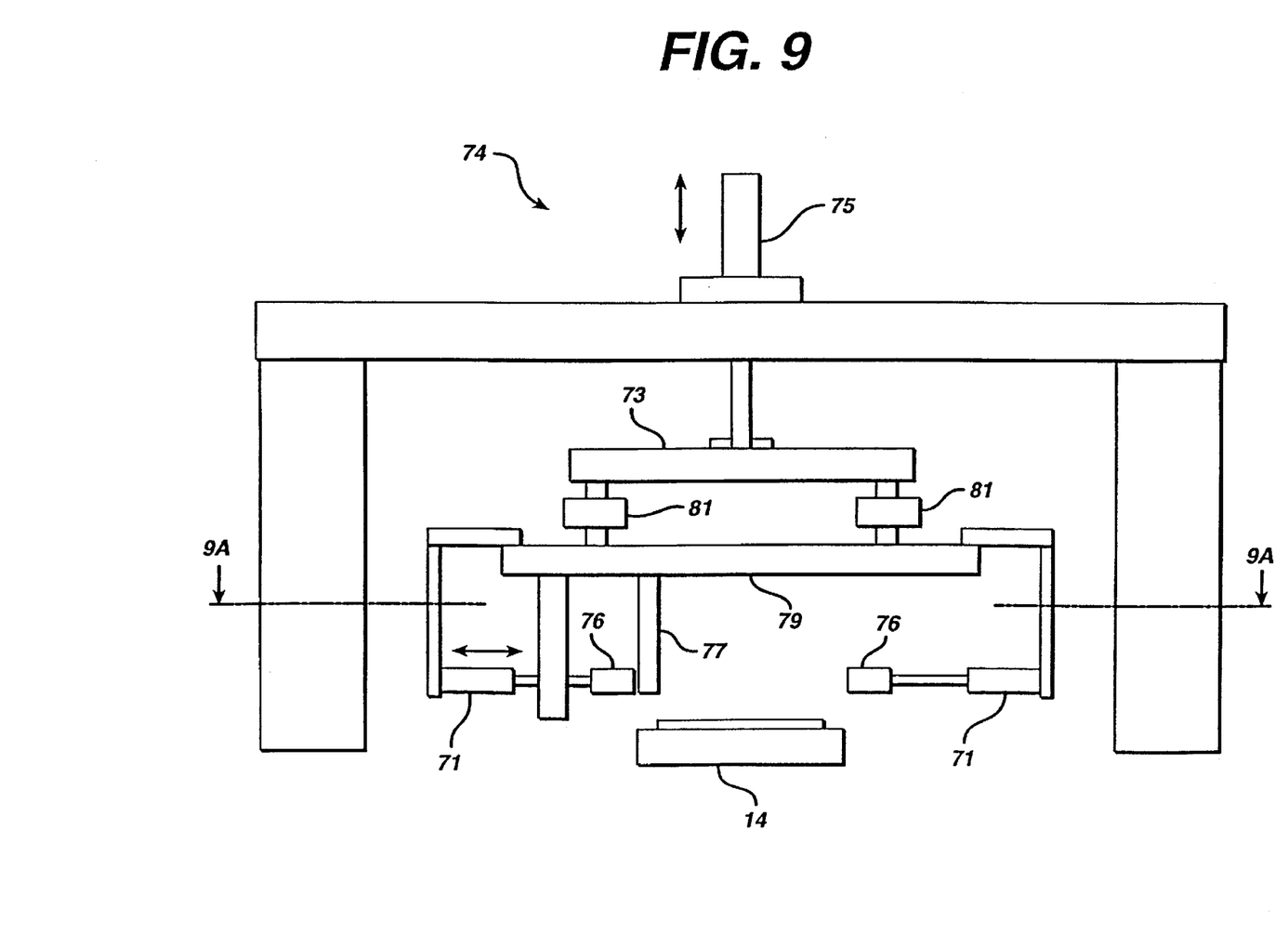
FIGS. 9 and 9A are respectively side elevational and sectional views of the mechanical chucking station in which positioning arms mechanically chuck each of the laminated foil covers to ensure that each is properly positioned relative to a 1×5 row of package bases in the support pallet.

At the third station 48, a 1×5 array of fiber optic probes 58, FIGS. 2 and 9, are positioned sequentially above each 1×5 row of the 2×5 array of package bases to verify the presence of each package base 16 in the array of package cavities 32 in the pallet. Each fiber optic probe 58 is positioned centrally over the open flange 18 area illustrated on the right side of FIG. 5 of each blister package base 16, and the fiber optic probe 58 illuminates each package base 16, and then detects the radiation reflected therefrom to verify the presence of each blister pack base 16. The fiber optic probes 58 can be of a type available commercially from Omron. Each such fiber optic detector probe 58 comprises a dual optical fiber arrangement in which one optical fiber carries light to illuminate the flange 18 of each package base 16 and a second optical fiber carries light reflected from the package base to a photodetector.

At the fourth station 50, referring to FIGS. 1, 7 and 8, the slide unit 52 supports a holder arm 59 which holds a 1×5 array of dosing tubes 60, each of which is supplied by a separate dosing pump 62. Each dosing tube 60 deposits a precise dosage of saline solution into the cavity 24 in each blister pack base 16, such that each contact lens 26 is completely immersed in saline solution. The rate of pumping of saline solution and the diameter of each dosing tube 60 is chosen such that no saline solution splashes from any of the cavities of any of the blister packs, which is very important as any saline solution splashed onto any sealing flange 18 surfaces would interfere with subsequent sealing and packaging operations.

The diameter of each dosing tube 60, FIG. 7, and the pumping rate therethrough have been determined empirically, with the internal diameter of each dosing tube 60 at the exit orifice being approximately ⅛ inch, and the pumps 62 being positive displacement ⅜ (or possibly ½) inch diameter piston metering pumps, as are available from Oyster Bay Pump Works. The amount of saline solution pumped into each package base is 950 μliters ±50 μliters. Saline solution is available in the plumbing of the building in which the packaging station is located to supply the metering pumps.

The optical verification probes 5B are one pallet increment ahead of the dosing tubes 60 to verify that the package bases are present before the dosing tubes fill the package bases with saline solution.

At a subsequent fifth dosage verification station 64, referring to FIG. 1, the slide unit 52 supports a 1×5 array of optical probes 66 positioned above the array of blister pack bases, which verify the presence of a measured dose (given level) of saline solution in each blister pack base. The operation of the slide unit 52 is the same as previously described. Each detector can be a reflective sensor as is commercially available from Omron, or could be an ultrasonic detector, or could be a proximity sensor or could be a fiber optic probe, as commercially available from Keyence as model 24W-V25R, used with an amplifier, model 24W-AA1C. Each detector checks and verifies for a proper height of saline solution in each blister pack base. The verification of a measured dosage of saline solution can be considered to be optional, particularly if the reliability of the dosing equipment is high.

The arrangement is such that after the conveyor is stopped, the slide unit 52 is translated to its upstream position which positions the detectors 58, tubes 60 and detectors 66 over the upstream 1×5 row of package bases to perform their respective functions, after which the slide unit 52 is translated to its downstream position which positions the detectors 58, tubes 60, and detectors 66 over the downstream 1×5 row of package bases to perform their respective functions, after which the conveyor is incrementally indexed to advance the next set of pallets, and the above cycle of operation is then repeated.

At a subsequent foil pick and place station 70, a pair of strips of laminar foil cover sheets is placed over the 2×5 array of package bases. Each laminar top sheet covers a 1×5 column of bases, and has printed thereon all identification indicia required for the final package. The laminar top cover sheets are produced by a foil labeling machine pursuant to the disclosure of patent application Ser. No. 08/442,234, filed May 15, 1995. The foil labeling machine extends at a right angle to the linear packaging machine, as indicated by the FOIL arrow in FIG. 1. The pair of laminar top cover sheets from the labeling machine is placed by a foil pick and place unit 23, illustrated in FIGS. 2 and 3, having an array of suction cups 72 to lift and place a laminar top sheet over the top of each 1×5 row of the 2×5 array of package bases. Each top cover sheet for each 1×5 row is approximately 150 mm long and 45 mm wide.

Figure 9A:
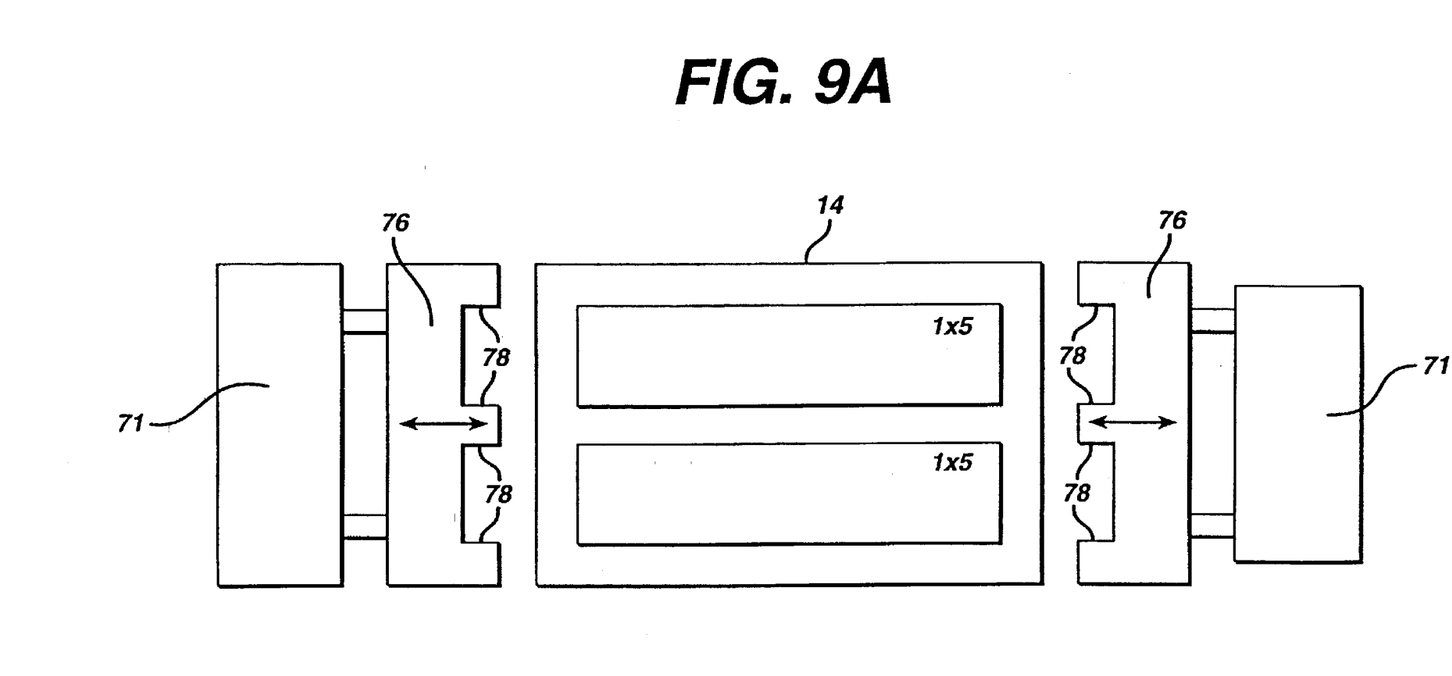

Referring to FIGS. 1, 9 and 9A, at a subsequent mechanical chucking station 74, positioning arms 76 mechanically chuck each laminated foil cover to ensure that it is properly positioned and aligned relative to the package bases in the support pallet. The arrangement preferably includes two movable chucking arms 76, mechanically translated by pneumatic air cylinders 71 positioned at opposite ends of a row of package bases. Each movable chucking arm includes two angled U brackets 78 which engage and center one end of the sheet of laminated foil covers relative to a row of package bases. A movable upper support plate 73 is vertically driven between upper and lower positions by a pneumatic air cylinder 75. Conical alignment positioning members 17 with conical alignment cavities are also carried at 77 by a lower support plate 79 to align the lower support plate 79 with a pallet 14. The lower support plate 79 is coupled to the upper support plate 73 by a plurality of floating joints B1 to allow the inspection head to shift laterally a slight amount while the alignment cones are engaging the conical alignment cavities to precisely align the mechanical chucking head with a pallet.

At a subsequent cover presence verification station 80, optical probes 82, 84 in an optical inspection station 27 verify the presence and correct general positioning of each foil cover sheet over the package bases in the support pallet. An optical inspection station is illustrated in detail in FIGS. 10 and 11, and optically verifies the presence and correct general positioning of the two laminar top sheets on the two 1×5 rows of product bases.

Figure 10:
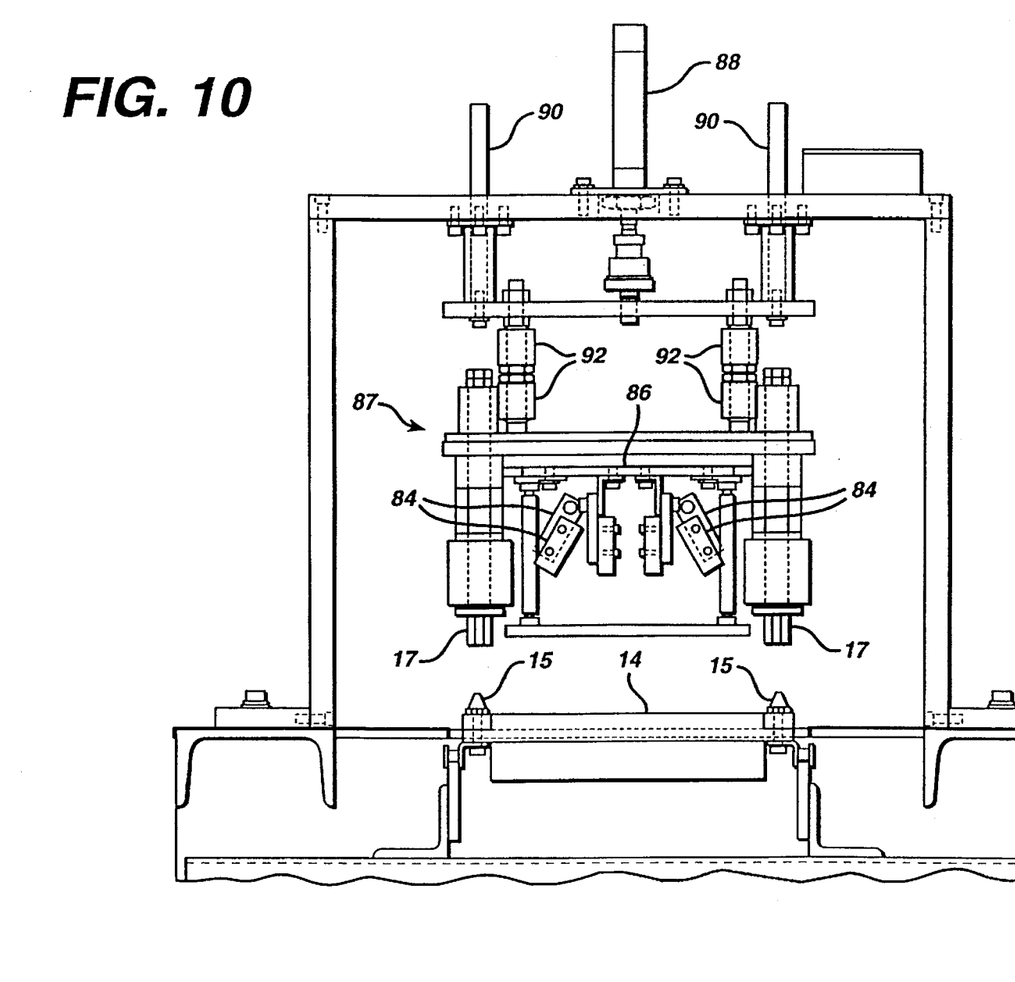
FIGS. 10 and 11 are respectively front and side elevational views of an optical inspection station, including an inspection plate mounting a plurality of optical detector probes, the alignment thereof, and the pneumatic drive therefor.
Figure 11:
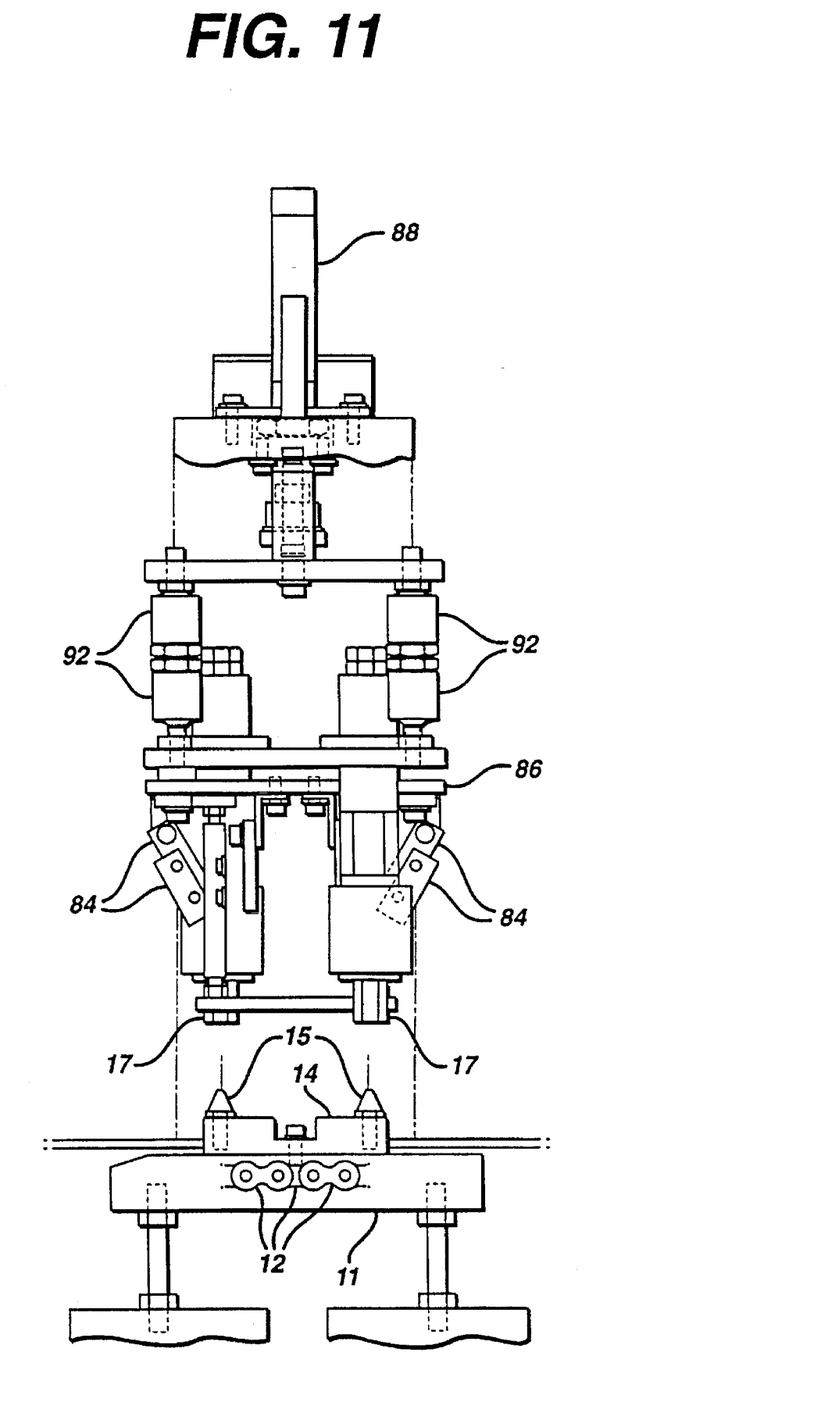
Figure 12:
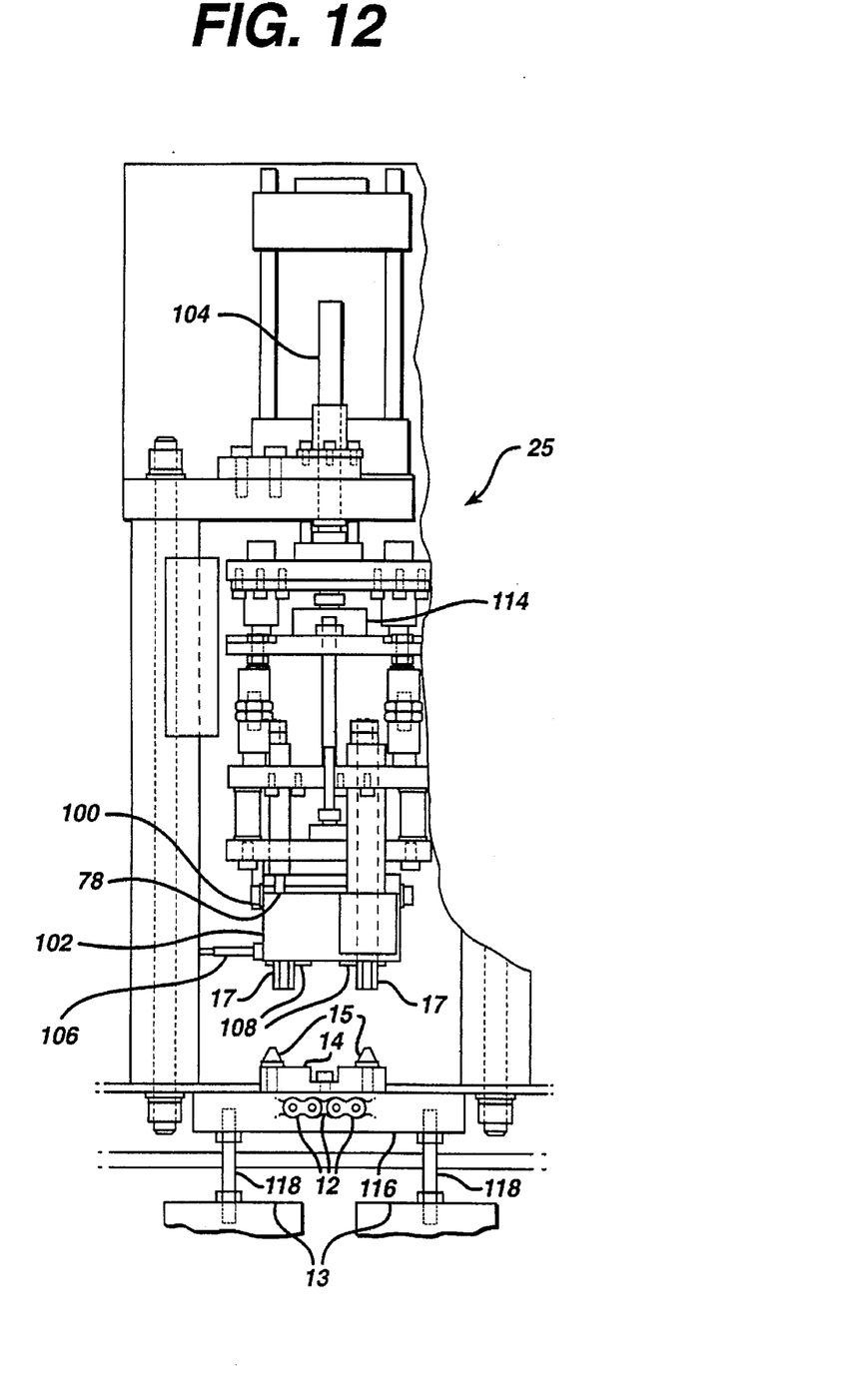
FIG. 12 is a side elevational view of a heat sealing station having a heat sealing head and a pneumatic press therefor.

The optical inspection station includes an optical inspection plate 86 which carries the plurality of optical probes 82, 84 positioned to examine the outer edges of each foil cover sheet. The optical detector probes are preferably positioned with one probe 82 at each end (along the 45 mm side) and one probe 84 along the lengthwise edge (along the 150 mm side) of a properly positioned sheet of laminated foil cover on each 1×5 row. Each optical detector probe is preferably a triangulation type of probe wherein an optical beam from an optical fiber is triangulated and reflected by the foil cover to an angularly positioned optical fiber detector, as are available commercially from Omron. The optical inspection station 27 ensures the presence and general positioning of a laminated foil cover sheet on each row of package bases, to ensure that a heated sealing head in a subsequent heat sealing station does not press down on an uncovered row of package bases which would then melt onto and foul the heated sealing head.

A movable inspection head 87 carrying the sensor plate 86 is vertically driven between upper and lower positions by a pneumatic air cylinder 88 while it translates along four corner shafts 90. Conical alignment positioning members 17 with conical alignment cavities are also carried by the inspection head 87 to align the inspection head with a pallet 14, and the inspection head is coupled to the pneumatic drive cylinder by a plurality of floating joints 92 to allow the inspection head to shift laterally a slight amount while the alignment cones are engaging the conical alignment cavities to precisely align the inspection head with a pallet. In an alternative embodiment, the optical probes 82, 84 can preferably be mounted in apertures in an optical inspection plate 94, as indicated generally in FIG. 1.

At a subsequent work station designated 96, referring to FIGS. 1 and 13, the top sheet is heat sealed to the base containers of the blister packs. A heated seal head 98 heated by a plurality of five electric heaters 100 mounted at spaced intervals along the length of the heating head plate 98. The heating head plate 98 is secured to the back of a heat seal die or head 102, and is supported by a pneumatic cylinder or press 104 which presses the heated seal head 102 against the laminar top sheets on the package bases 16, which are supported by the pallet 14 such that the foil laminate and base container flanges are squeezed between the heated seal head and the pallet. The heated seal head is electrically heated, and the temperature thereof is measured by thermal transducers 106 on each side of the seal head 102 to maintain the correct temperature. The temperature is maintained in a range of 214° C.±1.5° C., which is high when compared to similar prior art arrangements.

The heated seal head comprises a 2×5 array of cylindrical sealing elements 108, each of which secures the top laminar sheet to each package base 16 with an annular seal around the cavity 24 in the package base 16. Conical alignment positioning members 17 with conical alignment cavities are also carried on heated seal head 98 to align the seal head with a pallet 14, and the seal head 98 is coupled to the pneumatic drive cylinder 104 by a plurality of floating joints 110 to allow the seal head to shift laterally a slight amount while the alignment cones are engaging the conical alignment cavities to precisely align the seal head with a pallet.

In operation, the back force generated by the pneumatic cylinder is measured by an in-line load cell 114, and a solid state timer 116, FIG. 1, is initiated when a force is reached of a given percentage, e.g., 60–75%, of the peak force of which the pneumatic cylinder is capable. The solid state timer times a relatively short time period of approximately 1.0 to 1.4 seconds, after which the pressure in the pneumatic cylinder 108 is released. This approach, when compared with similar prior art approaches, is very hot, very hard and very short, which creates a seal which is both detachable and consumer friendly.

The endless conveyor is reinforced under the heat sealing station to withstand the heat sealing forces imparted thereto by the pneumatic cylinder 108. The pneumatic cylinder 108 at the heat sealing station applies a substantial force to the support pallet, and accordingly the endless conveyor is reinforced by a die stopper support block 116 supported on studs 118 projecting from the frame 13 beneath the pneumatic press to withstand the forces imparted thereto by the pneumatic press.

A second optical inspection station 29 is located downstream of the heat sealing station 96, and also includes a plurality of optical detector probes 118 which examine the outer edges of each sheet of laminated foil covers on the array of package bases to ascertain that the sheet is properly and precisely positioned and heat sealed relative to the array of package bases. The optical detector probes are preferably positioned with five probes 118 along the lengthwise edge (along the 150 mm side) of a properly positioned sheet of laminated foil cover on each 1×5 row. Each optical detector probe is preferably a triangulation type of probe wherein an optical beam from an optical fiber is triangulated and reflected by the foil cover to an angularly positioned optical fiber detector, as are available commercially from Omron.

Figure 3:
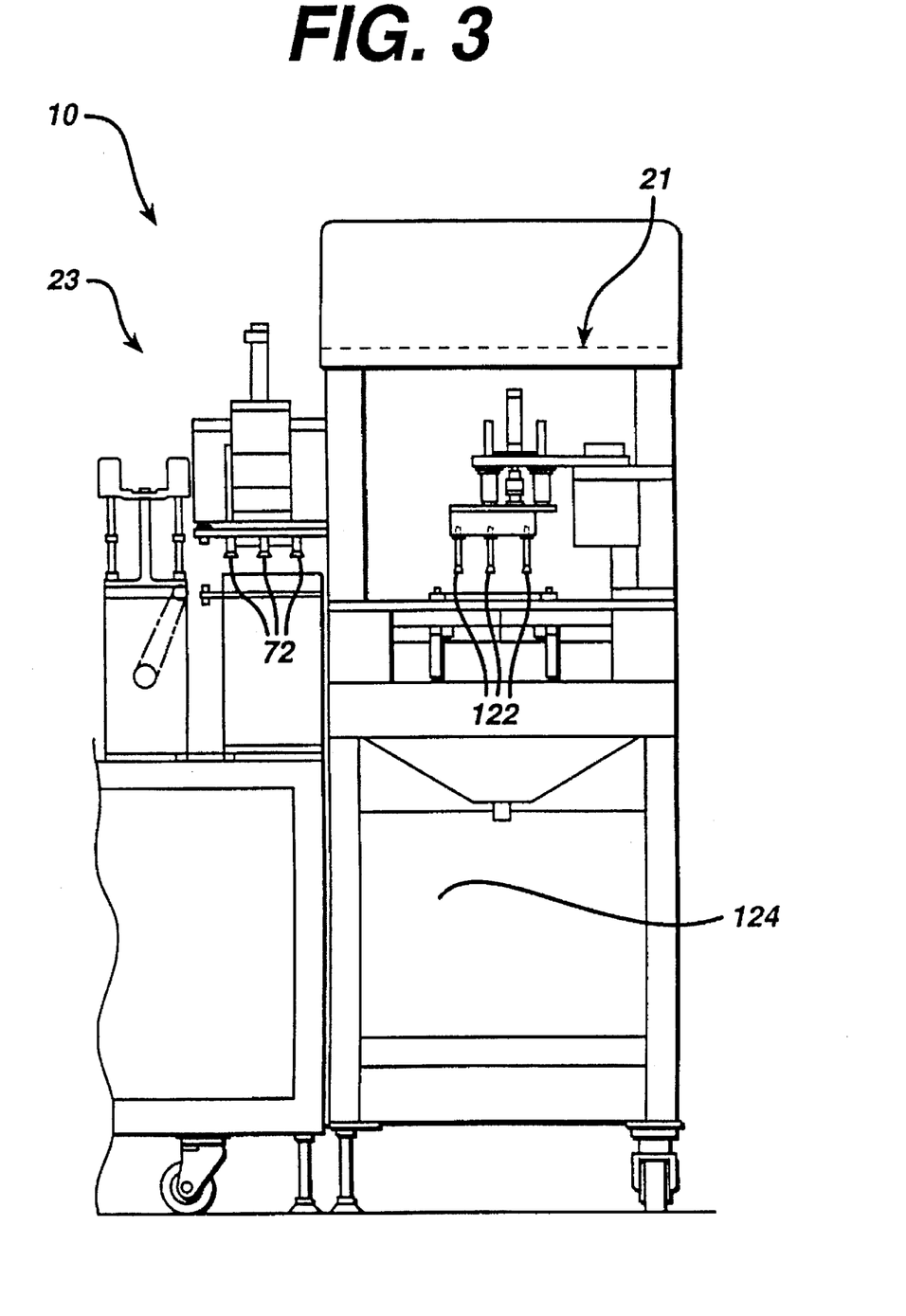
FIG. 3 is a right elevational view of the designed embodiment of the linear endless conveyor packaging arrangement illustrated in FIG. 2.

At the last position, referring to FIGS. 1, 2 and 3, a pneumatically driven robotic arm 21, having three vacuum suction cups 122 for each 1×5 array of blister packs, lifts each 1×5 array of blister packs from the support pallet 14, and deposits the array of blister packs to an output position.

The second optical inspection station 29 ascertains whether or not each sheet of laminated foil covers is properly positioned relative to a row of package bases. Rows of covered packages which pass inspection are transferred by the robotic transfer arm 21 from the endless conveyor to an output for final secondary packaging, while rows of covered packages which fail the inspection are not removed, and the system controller responds to the inspection station and controls the transfer equipment 21 to discriminate between passed and failed rows, even in the same support pallet. In greater detail, the robotic arm 21 applies a vacuum to suction cups 122 and transfers passed rows of covered packages from the endless conveyor to an output for secondary packaging, while a vacuum is not applied to the suction cups 122 for failed packages. A reject chute and bin 124 is positioned below the downstream end of the endless conveyor, and failed rows of covered packages remain on the endless conveyor and are dumped into the reject chute and bin.

After being deposited at the output position, the passed packages may then be subjected to sterilization, as in the instance when the product housed therein is intended to be employed in a medical capacity, for example, a product such as a contact lens which is adapted to be packed in a sterile saline solution and sealed in a compartment or cavity of the package. The blister packs can then be subjected to a secondary packaging operation, such as one in which packages of 1×5 blister packs are placed in a final outer package.

It is noted that the dosing verification may be eliminated in some embodiments. Moreover, in alternative embodiments, the endless conveyor could be designed with fewer (or more) support pallets 14, positioned therearound, depending upon the number of different functions to be accomplished by the packaging arrangement. Moreover, linear packaging arrangements having linear conveyor lines with linearly spaced stations therealong are also contemplated in alternative embodiments of the present invention.

While several embodiments and variations of the present invention for a rotary packaging station are described in detail herein, it should be apparent that the disclosure and teachings of the present invention will suggest many alternative designs to those skilled in the art.

What is claimed is:

1. A packaging arrangement for packaging products, comprising:
   a. at an initial station a loader which loads an array of individual blister package bases, each of which has a contact lens therein, into a support pallet stopped at the initial station;
   b. a movable endless conveyor which transports a plurality of the support pallets, spaced equally apart along the endless conveyor, each of which is designed to support and align an array of individual package bases;
   c. means for intermittently moving the endless conveyor through substantially equal incremental movements from an upstream direction to a downstream direction, with stops between each movement, such that each support pallet with an array of individual package bases thereon is sequentially stopped at spaced stations in the packaging arrangement; and
   d. a slide unit supported above the endless conveyor for reciprocating upstream and downstream movement relative to the endless conveyor, said slide unit supporting an array of operating means for performing operating functions on an array of individual package bases supported in a pallet positioned below the slide unit.

2. A packaging arrangement as claimed in claim 1, wherein:
   a. at a subsequent foil placement station, a placer unit places at least one sheet of laminated foil covers over the array of package bases;
   b. at a subsequent mechanical chucking station, at least one movable chucking arm mechanically chucks each sheet of laminated foil covers to ensure that the sheet of laminated foil covers is properly positioned and aligned relative to the array of package bases; and
   c. at a subsequent heat sealing station, a heated sealing head heat seals the laminated foil covers to the package bases.

3. A packaging arrangement as claimed in claim 1, wherein each support pallet supports and aligns a plurality of adjacent rows of individual package bases, and said slide unit is supported for reciprocating upstream and downstream movement a distance equal to the distance between adjacent rows, such that the slide unit positions the array of operating means over successive rows in each support pallet.

4. A packaging arrangement as claimed in claim 1, wherein said slide unit supports a plurality of different arrays of operating means, spaced apart along the endless conveyor, with each array of operating means performing a different operating function on the individual package bases.

5. A packaging arrangement as claimed in claim 4, wherein said plurality of arrays of operating means are spaced apart by a distance equal to the distance separating adjacent pallets on the endless conveyor, such that each array of operating means is positioned above a different pallet on the endless conveyor.

6. A packaging arrangement as claimed in claim 5, wherein a first array of operating means includes an array of optical detector probes for performing an optical detecting function on the individual package bases, and a second array of operating means includes an array of dispensing nozzles for dispensing given dosages of saline solution into the individual package bases, and a third array of optical detector probes for verifying that given dosages of saline solution having been dispensed into the individual package bases.

7. A packaging arrangement as claimed in claim 4, wherein the plurality of different arrays of operating means includes an array of optical detector probes which verify the presence of each package base in the array of package bases supported by the pallet.

8. A packaging arrangement as claimed in claim 4, wherein the plurality of different arrays of operating means includes an array of dispensing nozzles positioned above the package bases, for dispensing a given dosage of saline solution into each package base.

9. A packaging arrangement as claimed in claim 8, wherein the plurality of different arrays of operating means includes an array of optical detector probes positioned above the endless conveyor downstream of the array of dispensing nozzles to verify that a dosage of saline solution has been deposited into each package base.

10. A packaging arrangement as claimed in claim 1, wherein after loading of the package bases into a support pallet at the initial station, an alignment probe verifies the alignment of the packaging bases in the support pallet to check that no package bases are skewed or tilted in the support pallet.

11. A packaging arrangement as claimed in claim 10, wherein the alignment probe includes at least one through-beam detector which directs a beam of light along the length of and just above a row of package bases supported in the pallet to a detector at the other end of the column, such that a package base which is skewed or tilted in the pallet interrupts the through beam, and the photodetector at the other end of the through beam so indicates.

12. A packaging arrangement as claimed in claim 2, wherein at the foil placement station, a foil pick and place unit, having an array of suction cups, lifts and places at least one sheet of laminated foil covers over the array of package bases.

13. A packaging arrangement as claimed in claim 2, wherein each movable chucking arm includes an angled U bracket which engages and centers an end of a sheet of laminated foil covers relative to a row of package bases.

14. A packaging arrangement as claimed in claim 2, including two movable chucking arms positioned at opposite ends of a row of package bases, and each movable chucking arm includes an angled U bracket which engages and centers an end of a sheet of laminated foil covers relative to a row of package bases.

15. A packaging arrangement as claimed in claim 2, wherein a first optical inspection station is located upstream of the heat sealing station, and includes a plurality of optical detector probes which examine the outer edges of each sheet of laminated foil covers on the array of package bases to determine that the sheet of laminated foil covers is properly positioned relative to the array of package bases.

16. A packaging arrangement as claimed in claim 15, wherein the first optical inspection station is located downstream of the mechanical chucking station, to ascertain the presence and proper positioning of a sheet of laminated foil cover on the array of package bases.

17. A packaging arrangement as claimed in claim 15, wherein a second optical inspection station is located downstream of the heat sealing station, and includes a plurality of optical detector probes which examine the outer edges of each sheet of laminated foil covers on the array of package bases to determine that the sheet of laminated foil covers is properly positioned relative to the array of package bases.

* * * * *